United States Patent [19]

Teramoto et al.

[11] Patent Number: 4,980,421

[45] Date of Patent: Dec. 25, 1990

[54] NOVEL CATALYST FOR HYDROGENATION OF POLYMER AND PROCESS FOR HYDROGENATING POLYMER WITH THE CATALYST

[75] Inventors: Toshio Teramoto; Kunio Goshima; Mikio Takeuchi, all of Yokkaichi, Japan

[73] Assignee: Japan Synthetic Rubber Co., Ltd., Tokyo, Japan

[21] Appl. No.: 343,580

[22] Filed: Apr. 26, 1989

[30] Foreign Application Priority Data

Apr. 28, 1988 [JP] Japan ................................ 63-104256

[51] Int. Cl.$^5$ .............................................. C08F 8/04
[52] U.S. Cl. .................................. 525/338; 525/332.8; 525/332.9; 525/333.1; 525/333.2; 525/339
[58] Field of Search ................................ 525/338, 339

[56] References Cited

U.S. PATENT DOCUMENTS 4,501,857  2/1985  Kishimoto et al. .................. 525/338
4,673,714  6/1987  Kishimoto et al. .................. 525/338

FOREIGN PATENT DOCUMENTS 61-28507  2/1986  Japan .
2134909  8/1984  United Kingdom .

Primary Examiner—Bernard Lipman
Attorney, Agent, or Firm—Oblon, Spivak, McClelland, Maier & Neustadt

[57] ABSTRACT

A hydrogenation catalyst consisting essentially of (A) at least one bis(cyclopentadienyl)titanium compound represented by the formula (1):

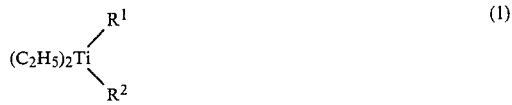

wherein $R^1$ and $R^2$, which may be the same or different, represent halogen atoms, hydrocarbon groups, aryloxy groups, alkoxy groups or carbonyl groups, and (B) at least one lithium compound represented by the formula (2):

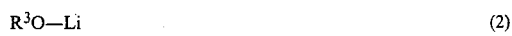

wherein $R^3$ represents a hydrocarbon group, or a reaction mixture of an organolithium compound with an alcoholic or phenolic hydroxyl group-containing compound, the (A) component/the (B) component molar ratio being 1/0.5 to 1/20, and optionally (C) at least one reducing organometallic compound selected from the group consisting of aluminum compounds, zinc compounds and magnesium compounds, the (A) component/the (C) component molar ratio being 1/0.5 to 1/20. The above hydrogenation catalyst is effectively applied to the hydrogenation of a polymer having olefinic double bonds to produce a hydrogenated polymer having a high degree of hydrogenation at a high hydrogenation rate with a high reproducibility.

15 Claims, No Drawings

NOVEL CATALYST FOR HYDROGENATION OF POLYMER AND PROCESS FOR HYDROGENATING POLYMER WITH THE CATALYST

This invention relates to a catalyst for the hydrogenation of a polymer having olefinic double bonds and a process for hydrogenating a polymer having olefinic double bonds to impart to the polymer weather resistance, heat resistance and oxidation resistance.

Polymers having olefinic double bonds, a representative of which is a conjugated diene polymer have generally been widely used as elastomers or the like. The olefinic double bonds in the polymers are advantageously utilized in vulcanization or the like but they cause deterioration of weather resistance and heat resistance of the polymer. Therefore, the field of application of the polymer has been limited.

The problem that the polymer is inferior in weather resistance, heat resistance and the like can be substantially solved by hydrogenating the polymer to remove the double bonds from the polymer chain. For this purpose, generally, the polymers having olefinic double bonds have been hydrogenated using (1) a carrier-supported heterogeneous catalyst in which a metal such as nickel, platinum, palladium or the like is supported on a carrier such as carbon, silica, alumina or the like or (2) a homogeneous catalyst obtained by reacting an organometallic compound of nickel, cobalt, titanium or the like with a reducing compound such as an organoaluminum, an organomagnesium, an organolithium or the like in a solvent.

The carrier-supported heterogeneous catalyst (1) is generally lower in activity than the homogenous catalyst (2) and requires severe conditions such as high temperature and high pressure. Also, when a polymer is hydrogenated, the contact between the polymer and the catalyst causes more difficult matter because of the influence of the viscosity of the reaction system, the influence of stereohindrance of the polymer or the like. Accordingly, heretofore, much catalyst has been required for the efficient hydrogenation of the polymer and this has been economically disadvantageous. Furthermore, said hydrogenation requires higher temperature and higher pressure, and hence, decomposition of the polymer and the gelation of the reaction system tend to be caused resulting in an increase of the energy cost. Also, in the hydrogenation of a copolymer of a conjugated diene with a vinyl aromatic hydrocarbon, even hydrogenation of the aromatic ring portion takes place and it has been difficult to selectively hydrogenate only the double bonds in the conjugated diene portion.

On the other hand, with the homogeneous catalyst, the hydrogenation proceeds usually in a homogeneous system. Therefore, as compared with the carrier-supported heterogeneous catalyst, the homogeneous catalyst is generally high in activity and a small amount of the catalyst enables a satisfactory hydrogenation to be effected at a low temperature and a low pressure. In addition, when appropriate hydrogenation conditions are selected, it is possible to preferentially hydrogenate the conjugated diene portion of a copolymer of a conjugated diene with a vinyl aromatic hydrocarbon.

However, in the case of the homogenous catalyst, the hydrogenation activity is greatly varied depending upon the reduction state of the catalysts, and therefore, the reproducibility of the hydrogenation with the homogenous catalyst is inferior and it is difficult to obtain a hydrogenated polymer having a high degree of hydrogenation with a high reproducibility.

Moreover, the catalyst components tend to be converted into inactive substances owing to impurities. Therefore, the impurities in the reaction system deteriorate the hydrogenation activity of the catalyst, and this is also a cause for making it difficult to obtain a high reproducibility.

The fact that a highly hydrogenated polymer has not been obtained with a high reproducibility is a great obstacle to utilize the homogenous catalytic hydrogenation for the purpose of enhancing the weather resistance and heat resistance of the polymers.

In the conventional hydrogenation of polymers with a homogenous catalyst, the hydrogenation rate cannot be said to be sufficiently high. In addition, the hydrogenation activity is varied depending upon the reduction state of the catalyst and the impurities in the reaction system and the reaction rate is varied similarly. Therefore, there has been a problem in hydrogenating a polymer with a homogenous catalyst in industry.

Therefore, it has been strongly desired that there is developed a highly active hydrogenation catalyst whose activity is hardly affected by impurities in the reaction system and which is capable of producing a highly hydrogenated polymer at a high hydrogenation rate stably regardless of the conditions for preparing the catalyst.

There has been already known hydrogenation with a catalyst comprising bis(cyclopentadienyl)titanium compound as one component (see, for example, M. F. Sloan et al., J.A.C.S., 85, 4014–4018 (1965); Y. Tajima et al, J. Org. Chem., 33, 1689–1690 (1968); British Pat. No. 2,134,909; Japanese Patent Application Kokai No. 61-28507; etc.).

However, the above-mentioned problems have not been solved by these known methods and these publications disclose no suggestions for solving the problems.

Accordingly, the present inventors have made extensive research on a hydrogenation catalyst which has no disadvantages possessed by conventional homogenous hydrogenation catalysts and which is capable of producing a hydrogenated polymer having a high hydrogenation degree with a high reproducibility, and as a result, have found that a catalyst consisting of bis(cyclopentadienyl)titanium compound and a specific lithium compound indicates a very high hydrogenation activity and surprisingly produces a highly hydrogenated polymer at a high hydrogenation rate stably regardless of the impurities in the reaction system and the conditions for preparing the catalyst.

An object of this invention is to provide a hydrogenation catalyst which can selectively hydrogenate the olefinic double bonds contained in the molecule of a polymer at a high hydrogenation rate under mild conditions, said catalyst being hardly affected by impurities in the reaction system to give a highly hydrogenated polymer with a high reproducibility.

Another object of the invention is to provide a process for selectively and highly hydrogenating a polymer having olefinic double bonds at a high hydrogenation rate using the above catalyst.

Other objects and advantages of the invention will become apparent from the following description.

According to this invention, there is provided a hydrogenation catalyst consisting essentially of (A) at least one bis(cyclopentadienyl)titanium compound represented by the formula (1):

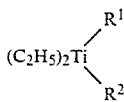

wherein $R^1$ and $R^2$, which may be the same or different, represent halogen atoms, hydrocarbon groups, phenolic hydroxyl groups, alkoxy groups or carbonyl groups, and (B) at least one lithium compound represented by the formula (2):

$$R^3O-Li \qquad (2)$$

wherein $R^3$ represents a hydrocarbon group, or a mixture of an alkyllithium compound with an alcoholic or phenolic hydroxyl group-containing compound, the (A) component/the (B) component molar ratio being 1/0.5 to 1/20, and optionally (C) at least one reducing organometallic compound selected from the group consisting of aluminum compounds, zinc compounds and magnesium compounds, the (A) component/the (C) component being 1/0.5 to 1/20.

This invention further provides a process for hydrogenating the olefinic double bonds of a polymer having olefinic double bonds which comprises contacting the polymer with hydrogen in an inert organic solvent in the presence of the above-mentioned catalyst.

The polymer having olefinic double bonds to be hydrogenated in this invention includes all polymers having olefinic carbon-carbon double bonds in the polymer chain or in the side chains. Preferable polymers are conjugated diene polymers and random, block or graft copolymers of a conjugated diene and an olefinic monomer.

Such conjugated diene polymers include homopolymers of conjugated dienes and copolymers obtained by copolymerizing conjugated dienes with one another or copolymerizing at least one conjugated diene with at least one olefinic monomer copolymerizable therewith. The conjugated diene used in the production of such a conjugated diene includes those having 4 to about 12 carbon atoms such as 1,3-butadiene, isoprene, 2,3-dimethyl-1,3-butadiene, 1,3-pentadiene, 2-methyl-1,3-pentadiene, 1,3-hexadiene, 4,5-diethyl-1,3-octadiene, 3-butyl-1,3-octadiene, chloroprene and the like.

In view of utilizing the polymer advantageously in industry, 1,3-butadiene and isoprene are particularly preferred, and elastomers such as polybutadiene, polyisoprene and butadiene/isoprene copolymer are particularly preferable in carrying out this invention. Such polymers may have any microstructure; however, if the polymer has a low 1,2-vinyl content the solubility of the hydrogenated polymer is low and in order to hydrogenate the polymer uniformly the use of a specific solvent is required. Therefore, more preferably, the polymer to be hydrogenated should have a 1,2-vinyl content of about 10% or more.

On the other hand, the catalyst of this invention is used particularly preferably in the hydrogenation of a copolymer obtained by copolymerizing at least one conjugated diene with at least one olefinic monomer copolymerizable therewith. The conjugated diene to be used in the production of such a copolymer includes preferably the above-mentioned conjugated dienes. The olefinic monomer includes all monomers copolymerizable with the conjugated dienes, and alkenyl aromatic hydrocarbons are particularly preferable.

In order to obtain commercially useful and highly valuable elastomers and thermoplastic elastomers, copolymers of a conjugated diene and an alkenyl aromatic hydrocarbon are particularly important. The alkenyl aromatic hydrocarbon to be used in the production of such a copolymer includes specifically styrene, t-butylstyrene, α-methylstyrene, p-methylstyrene, divinylbenzene, 1,1-diphenylethylene, N,N-dimethyl-p-aminoethylstyrene, N,N-diethyl-p-aminoethylstyrene, vinylpyridine and the like. Particularly preferred are styrene and α-methylstyrene. Specific examples of the copolymer include butadiene/styrene copolymer, isoprene/styrene copolymer, butadiene/α-methylstyrene copolymer and the like and these are most preferable because they can give hydrogenated copolymers having commercially high value.

Such a copolymer includes random copolymers in which the monomers are statistically distributed throughout the polymer, tapered block copolymers, complete block copolymers and graft copolymers.

In order to obtain commercially useful thermoplastic elastomers, the copolymer comprises preferably 5% to 95% by weight of an alkenyl aromatic hydrocarbon.

The 1,2-vinyl content is preferably at least 10% by weight based on the total weight of the conjugated diene units, because the hydrogenated polymer obtained is excellent in polymer performance.

The polymer used in the hydrogenation in this invention has generally a molecular weight of about 1,000 to about 1,000,000, and may be a block copolymer of the straight chain type, the so-called branched chain type formed by coupling the polymers with a coupling agent, the radial type or the star type.

The coupling agent includes specifically (dichloromethyl)trichlorosilane, (dichlorophenyl)trichlorosilane 1,2-bis(trichlorosilyl)ethane, hexachlorosilane, 1,2,3,4,7,7-hexachloro-6-methyldichlorosylyl-2-norbornene, octachlorotrisiloxane, trichloromethyltrichlorosilane and the like.

Polymers terminally modified with a polar group in the living anionic polymerization and polymers modified with a polar group by other means are included. The polar group for the modification includes hydroxyl group, carboxyl group, ester group, isocyanate group, urethane group, amido group, urea group, thiourethane group and the like.

Other polymers produced by any of other known polymerization methods such as anionic polymerization method, cationic polymerization method, coordination polymerization method, radical polymerization method, solution polymerization method and emulsion polymerization method can be used.

Moreover, polymers of norbornene derivatives obtained by a ring-opening polymerization with a metathesis catalyst of Mo, W and the like are also included in the polymer having olefinic double bonds used in this invention.

Such monomers include specifically cycloalkenes such as cyclobutene, cyclopentene, cyclooctene, 1,5-cyclooctadiene, 1,5,9-cyclododecatriene, norbornene, 5-methyl-norbornene and the like; and norbornene derivatives such as methyl 5-norbornene-2-carboxylate ethyl 5-norbornene-2-carboxylate, phenyl 5-norbornene-2-carboxylate, methyl 2-methyl-5-norbornene-2-carboxylate, butyl 3-phenyl-5-norbornene-2-carboxylate, dimethyl 5-norbornene-2,3-dicarboxylate, cyclohexyl 5-norbornene-2-carboxylate, aryl 5-norbornene-2-carboxylate, 5-noboren-2-yl acetate, 5-norbornene-2-nitrile, 3-methyl-5-norbornene-2-nitrile, 2,3-dimethyl-5-norbornene-2,3-dinitrile, 5-norbornene-2-carboxylic acid amide, N-methyl-5-norbornene-2-carboxylic acid amide, N,N-diethyl-5-norbornene-2-carboxylic acid amide, N,N-dimethyl-2-methyl-5-norbornene-2,3-dicarboxylic acid diamide, 5-norborene-2,3-dicarboxylic acid dianhydride(himic acid anhydride), 2,3-dimethyl-5-norborene-2,3-dicarboxylic acid imide, N-phenyl-2-methyl-5-norborene-2,3-dicarboxylic acid imide, 5-methyl-5-carboxycyclohexylbicyclo[2,2,1]-2-heptene, 5-methyl-5-carboxy(4-tertbutylcyclohexyl)bicyclo[2,2,1]-2-heptene, 8-methyl-8-carboxycyclohexyltetracyclo[4,4,0,1$^{2.5}$,1$^{7.10}$]-3-dodecene, 5-methyl-5-carboxytricyclo[5,2,1,0$^{2.6}$]decyl-8'-bicyclo[2,2,1]-2-heptene and the like.

The catalyst of this invention consists essentially of (A) at least one bis(cyclopentadienyl)-titanium compound represented by the formula (1):

(1)

wherein R$^1$ and R$^2$, which may be the same or different, represent halogen atoms, hydrocarbon groups, phenolic hydroxyl groups, alkoxy groups or carbonyl groups, and (B) at least one lithium compound represented by the formula (2):

R$^3$O—Li     (2)

wherein R$^3$ represents a hydrocarbon group

The (A) component of the catalyst includes specifically bis(cyclopentadienyl)titaniumdimethyl, bis(cyclopentadienyl)titaniumdiethyl, bis(cyclopentadienyl)titaniumdi-n-butyl, bis(cyclopentadienyl)titaniumdi-sec-butyl, bis(cyclopentadienyl)titaniumdihexyl, bis(cyclopentadienyl)titaniumdioctyl, bis(cyclopentadienyl)titaniumdimethoxide, bis(cyclopentadienyl)titaniumdiethoxide, bis(cyclopentadienyl)titaniumdibutoxide, bis(oyolopentadienyl)titaniumdiphenyl, bis(oyclopentadienyl)titaniumdi-m-tolyl, bis(cyclopentadienyl)titaniumdi-p-tolyl, bis(cyclopentadienyl)titaniumdi-m,p-xylyl, bis(cyclopentadienyl)-titaniumdi-4-ethylphenyl, bis(cyclopentadienyl)-titaniumdi-4-butylphenyl, bis(cyclopentadienyl)-titaniumdi-4-hexylphenyl, bis(cyclopentadienyl)titaniumdiphenoxide, bis(cyclopentadienyl)titanium difluoride, bis(cyclopentadienyl)titanium dichloride, bis(cyclopentadienyl)titanium dibromide, bis(cyclopentadienyl)titanium diiodide, bis(cyclopentadienyl)titaniumdicarbonyl, bis(cyclopentadienyl)titaniumchloridemethyl, bis(cyclopentadienyl)titanium chloride ethoxide, bis(cyclopentadienyl)titanium chloride phenoxide, bis(cyclopentadienyl)titaniumdibenzyl and the like. These may be used alone or in combination of two or more. Of these bis(cyclopentadienyl)titanium compounds, the following compounds are preferred because they are high in hydrogenation activity to the olefinic double bonds in the polymer and enable good selective hydrogenation of the double bonds to be effected under mild conditions: bis(cyclopentadienyl)titaniumdimethyl, bis(cyclopentadienyl)titaniumdi-n-butyl, bis(cyclopentadienyl)titanium dichloride, bis(cyclopentadienyl)titaniumdiphenyl, bis(cyclopentadienyl)titaniumdi-p-tolyl, bis(cyclopentadienyl)titaniumdicarbonyl and bis(cyclopentadienyl)titaniumdibenzyl.

Moreover, bis(cyclopentadienyl)titanium dichloride is more preferable because when it is used in combination with the (B) component of the catalyst the highest activity is obtained.

The (B) component of the catalyst includes specifically methoxylithium, ethoxylithium, n-propoxylithium, i-propoxylithium, n-butoxylithium, sec-butoxylithium, t-butoxylithium, pentyloxylithium hexyloxylithium, heptyloxylithium, octyloxylithium, phenoxylithium, 4-methylphenoxylithium, 2,6-di-t-butyl-4-methylphenoxylithium, benzyloxylithium and the like.

Of these lithium compounds, 2,6-di-t-butyl-4-methylphenoxylithium is preferable because when it is combined with the (A) component the highest activity is obtained.

The (B) component of the catalyst is generally added from the exterior of the reaction system; however, it is possible to react an organolithium compound with an alcoholic or phenolic hydroxyl group-containing compound in the reaction system and use the reaction mixture as such as the (B) component for the hydrogenation catalyst of this invention.

The organolithium compound to be used in the above reaction includes methyllithium, ethyllithium, n-propyllithium, n-butyllithium, sec-butyllithium, isobutyllithium, n-hexyllithium, phenyllithium, p-tolyllithium, xylyllithium and the like.

In addition to the above low molecular weight organolithium compounds, a lithium terminated polymer in which lithium is bonded to the ends of a polymer as a living anion can also be used as the organolithium compound.

The alcoholic or phenolic hydroxyl group-containing compound to be used in the above reaction includes methanol, ethanol, n-propanol, i-propanol, n-butanol, sec-butanol, t-butanol, 1-pentanol, 2-pentanol, 3-pentanol, hexanol, heptanol, octanol, nonanol, decanol, undecanol, lauryl alcohol, 1,3-dichloro-2-propanol, allyl alcohol, cyclohexanol, cyclopentanol, phenol, o-bromophenol, m-bromophenol, p-bromophenol dichlorophenol, trichlorophenol, o-cresol, m-cresol, p-cresol, p-allylphenol, 2,6-di-t-butyl-p-cresol, xylenol, dihydroanthraquinone, dihydroxycoumarine, 1-hydroxyanthraquinone, m-hydroxybenzyl alcohol, resolcinol, leucaurine and the like.

A combination of n-butyllithium, sec-butyllithium or lithium-terminated polymer with 2,6-di-t-butyl-p-cresol is most preferable.

In addition to the (A) and (B) components of the catalyst, an organometallic compound having a reducing ability may be added as the (C) component of the catalyst.

The reducing organometallic compound includes aluminum compounds, zinc compounds, magnesium compounds and the like, and when the (C) component is added to the catalyst in such an amount that the titanium compound/the reducing organometallic compound molar ratio is 1/0.5 to 1/20 a highly hydrogenated polymer can be obtained with a high reproducibility.

The reducing organometallic compound includes specifically aluminum compounds such as trimethylaluminum, triethylaluminum, triisobutylaluminum, triphenylaluminum, diethylaluminum chloride, ethylaluminum dichloride, methylaluminum sesquichloride, ethylaluminum sesquichloride, diethylaluminum hydride, diisobutylaluminum hydride, triphenylaluminum, tri(2-ethylhexyl)-aluminum and the like; zinc compounds such as diethylzinc, bis(cyclopentadienyl)zinc, diphenylzinc and the like; and magnesium compounds such as dimethylmagnesium, diethylmagnesium, methylmagnesium bromide, methylmagnesium chloride, ethylmagnesium bromide ethylmagnesium chloride, phenylmagnesium bromide, phenylmagnesium chloride, dimethylmagnesium chloride and the like. In addition thereto, a compound comprising at least two reducing metals such as lithiumaluminum hydride can also be included.

In view of commercial availability, ease to handle and the like, triethylaluminum, triisobutylaluminum, diethylaluminum chloride and ethylaluminum dichloride are preferred.

In this invention, it is necessary that the (A) component/the (B) component molar ratio in the catalyst be 1/0.5 to 1/20. When the amount of the (B) component is less than 0.5 mole per mole of the (A) component, the catalyst activity is not sufficient and it becomes difficult to hydrogenate a polymer with the catalyst under mild conditions.

When the amount of the (B) component exceeds 20 moles per mole of the (A) component, it follows that a large amount of the (B) component which does not substantially participate in the enhancement of activity is used though the activity for hydrogenation is kept. This is economically disadvantageous. In addition, the gelation of polymer and side reactions are caused. The (A) component/the (B) component molar ratio is preferably 1/1 to 1/10.

When the (C) component is used together with the (A) and (B) components, it is necessary that the (A) component/the (C) component molar ratio be 1/0.5 to 1/20.

When the amount of the (C) component exceeds 20 moles per mole of the (A) component, the catalyst activity is rather lowered and no highly hydrogenated polymer is obtained. Even when the (C) component is not added, a highly hydrogenated polymer can be obtained; however, it is preferable to use the (C) component for obtaining a highly hydrogenated polymer with a high reproducibility at a higher reaction ate. The (A) component/the (C) component molar ratio is preferably 1/1 to 1/10.

When the (B) component is previously produced in a hydrogenation reaction system and thereafter the (A) component is added alone or in combination with the (C) component to the reaction system, it is preferable to mix the alkyllithium compound with the alcoholic or phenolic hydroxyl group-containing compound in a molar ratio of the alkyllithium/the alcoholic or phenolic hydroxyl group-containing compound of 5/1 to ½.

When the amount of the alkyllithium compound exceeds 5 moles per mole of the alcoholic or phenolic hydroxyl group-containing compound, an excess of the alkyllithium compound causes the gelation of the polymer or side reactions. Therefore, the use of such a large amount of the alkyllithium compound should be avoided.

On the other hand, when the molar ratio is less than ½, an excess of the alcoholic or phenolic hydroxyl group-containing compound acts as a catalyst poison to reduce the hydrogenation activity.

The molar ratio of the alkyllithium to the alcoholic or phenolic hydroxyl group-containing compound is preferably 3/1 to 1/1.5.

The amount of the (B) component produced in the reaction system is the same as when the (B) component is added from the exterior of the reaction system, and the molar ratio of the (A) component to the (B) component produced in the reaction system is 1/0.5 to 1/20, preferably 1/1 to 1/10.

When a catalyst having the above-mentioned composition is used, a highly hydrogenated polymer is produced with a high reproducibility without being affected by the catalyst-preparation conditions and the state of the catalyst in the reaction system.

The hydrogenation reaction is preferably effected in a solution of an olefinic double bond-containing polymer in an inert organic solvent. The inert organic solvent means a solvent which does not react with any of the materials used in the hydrogenation reactions. The solvent is preferably an aliphatic hydrocarbon such as n-pentane, n-hexane, n-heptane, n-octane or the like; an alicyclic hydrocarbon such as cyclopentane, cyclohexane, cycloheptane or the like; or an ether such as diethyl ether, tetrahydrofuran or the like, and these may be used alone or in combination of two or more. Also, aromatic hydrocarbons such as benzene, toluene, xylene and ethylbenzene may be used only when the aromatic double bonds are not hydrogenated under the selected hydrogenation conditions. It is more preferable and advantageous to produce the polymer to be hydrogenated in the same solvent as that to be used in the hydrogenation reaction of this invention and apply the reaction mixture as such to the hydrogenation reaction. The hydrogenation is effected at a concentration of the polymer of 1 to 50% by weight, preferably 10 to 30% by weight based on the weight of the solution.

The hydrogenation reaction of this invention is generally carried out by keeping the above polymer solution at the desired temperature, adding a hydrogenation catalyst thereto with or without stirring and subsequently introducing a hydrogen gas thereinto to reach the desired pressure.

In the hydrogenation reaction, it is preferable to first add only the (B) component for the catalyst to the reaction system and subsequently add thereto the (A) component alone or in combination with the (C) component.

Of course, the (A), (B) and (C) components may be previously mixed with one another and then added to the reaction system, or alternatively, they may be added separately to the reaction system.

When the (B) component is to be produced in the reaction system, the alkylaluminum is first added to the reaction system, and subsequently, the alcoholic or phenolic hydroxyl group-containing compound is added thereto, after which the (A) component is added alone or in admixture with the (C) component, whereby the hydrogenation can be carried out.

Each catalyst component may be added as such to the polymer solution, or may be added in solution in an inert organic solvent. When each catalyst component is used in solution in an inert organic solvent, the abovementioned solvents which do not react with any of the materials used in the hydrogenation reaction can be used as the inert organic solvent. Preferably, the same solvent as in the hydrogenation reaction should be used.

It is necessary to handle each catalyst component in an inert atmosphere. The inert atmosphere means an atmosphere which does not react with any of the materials used in the hydrogenation, and includes, for example, nitrogen, neon, argon and the like. Air and oxygen should not be used because they oxydize the catalyst to deactivate it.

When the catalyst components are previously mixed with each other on the outside of the reaction system, the mixing may be not only in an inert atmosphere but also in a hydrogen atmosphere.

The amount of the catalyst used in this invention is preferably such that the amount of the (A) component is 0.01 to 20 millimoles per 100 g of the polymer.

When the above amount falls within the above range, the olefinic double bonds in the polymer can be preferentially hydrogenated, substantially no hydrogenation of the aromatic double bonds is caused, and the hydrogenation proceeds with a very high activity, resulting in a hydrogenated polymer having a high degree of hydrogenation. Further, when the hydrogenation is repeatedly effected, the reproducibility is very high.

Even when the catalyst is added in an amount of more than 20 millimoles, the hydrogenation can be effected; however, the use of unnecessarily large amount of catalyst is economically disadvantageous, and the deashing and removal of the catalyst after the hydrogenation becomes complicated. In order to quantitatively hydrogenate the olefinic double bonds in the polymer under the selected conditions, the amount of the catalyst is preferably such that the amount of the (A) component is 0.05-10 millimoles.

The hydrogenation reaction of this invention is effected with hydrogen molecule, and it is preferable to introduce the hydrogen in the form of a gas into the polymer solution The hydrogenation reaction is preferably effected with stirring, whereby the hydrogen introduced can be quickly contacted with the polymer. The hydrogenation reaction is generally carried out at 0° C. to 120° C. When the temperature is lower than 0° C., the catalyst activity becomes low, the hydrogenation rate becomes low, and hence, it follows that a large amount of the catalyst is required. Also, when the temperature exceeds 120° C., decomposition and gelation of the polymer tend to accompany and the hydrogenation of the aromatic nuclei tend to occur. Therefore, the hydrogenation selectivity becomes low. It is more preferable that the temperature is in a range of 20° C. to 100° C.

The hydrogen pressure used in the hydrogenation is preferably 1 to 100 kg/cm$^2$G. When it is less than 1 kg/cm$^2$G, the hydrogenation rate becomes low and it becomes difficult to increase the degree of hydrogenation, and when it is more than 100 kg/cm$^2$G, the hydrogenation is substantially completed simultaneously with applying the hydrogen pressure and unnecessary side reactions and gelation are caused. The hydrogen pressure for hydrogenation is more preferably 4 to 20 kg/cm$^2$G, and the optimum hydrogen pressure is selected considering the amount of the catalyst added and other conditions. When the catalyst amount is smaller it is preferable to effect the hydrogenation under higher hydrogen pressure in the above-mentioned range.

The hydrogenation time in this invention is usually several seconds to 20 hours and can be appropriately varied in this range depending upon the other hydrogenation conditions.

The hydrogenation reaction in this invention may be carried out in a batchwise manner, a continuous manner or any other manner, and the progress of hydrogenation reaction can be checked by measuring the amount of hydrogen absorbed.

According to the process of this invention, it is possible to control the degree of hydrogenation of the olefinic double bonds in the polymer to any desired value.

When the hydrogenation catalyst of this invention is used, a highly hydrogenated polymer can be obtained at a high hydrogenation rate with a high reproducibility, and therefore, the hydrogenation catalyst is very advantageous in industry.

The hydrogenation catalyst of this invention can also be used in the hydrogenation of olefines such as styrene and the like.

In the process of this invention, after the hydrogenation, the catalyst residue can easily be removed from the hydrogenation mixture to isolate the hydrogenated polymer. For example, to the hydrogenation mixture may be added a polar solvent which is a poor solvent for the hydrogenated polymer such as acetone, an alcohol or the like to precipitate the hydrogenated polymer. Alternatively, the hydrogenation mixture is poured into hot water with stirring and then the solvent and the water are removed by distillation. In the course of the isolation of the hydrogenated polymer, the catalyst is substantially decomposed and removed from the hydrogenated polymer. Accordingly, no special operation is required for de-ashing and removing the catalyst. However, in order to effect the removal of the catalyst more effectively, it is preferable to add an acidic polar solvent or water to the hydrogenation mixture.

The hydrogenated polymer obtained according to the process of this invention can be used as elastomers, thermoplastic elastomers or thermoplastic resins having excellent weather resistance and acid resistance. It can also be used in admixture with additives such as ultraviolet absorbers, oils, fillers and the like or as a blend with other elastomers or resins. Therefore, the hydrogenated polymer obtained by the process of this invention is very useful in industry.

This invention is further explained in more detail below referring to Examples, which are not by way of limitation but by way of illustration.

In the Examples, the 1,2-vinyl content in the conjugated diene polymer used was determined from an infrared absorption spectrum according to the Hampton method [R.R. Hampton, Anal. Chem., 29, p. 923 (2949)].

EXAMPLES 1 to 4

Each of the following polymers was dissolved in purified and dried cyclohexane to adjust the polymer concentration to 20% by weight.

A. JSR SL 552 (product of Japan Synthetic Rubber Co., Ltd.) which is a branched random copolymer of styrene and butadiene having a bound styrene content of 24% and a bound 1,2-vinyl content in the butadiene portion of 39%.

B. JSR SL 574 (product of Japan Synthetic Rubber Co., Ltd.) which is a branched random copolymer of styrene and butadiene having a bound styrene content of 15% and a bound 1,2-vinyl content in the butadiene portion of 57%.

C. KRATON ® D-1101 (product of Shell) which is a styrene/butadiene/styrene block copolymer D. KRATON ® D-1111 (product of Shell) which is a
styrene/isoprene/styrene block copolymer Into a 10-liter autoclave was charged 5 kg of the polymer solution thus obtained and the solution was maintained at 70° C. with stirring.

Subsequently, 1.5 millimoles of 2,6-di-t-butyl-4-methylphenoxylithium was added to the solution, and thereafter, 100 ml of a toluene solution of 0.25 millimole of bis(cyclopentadienyl)titanium dichloride was charged into the autoclave. Then, dried hydrogen gas was fed to the autoclave at a pressure of 10 kg/cm$^2$G, and the mixture was stirred for one hour to hydrogenate the polymer.

The conditions of the autoclave were returned to normal temperature and normal pressure and the reaction mixture was taken out from the autoclave and poured into water with stirring. Thereafter, the solvent was removed by steam distillation to obtain a white hydrogenated polymer.

The degree of hydrogenation of the hydrogenated polymer obtained was determined from its infrared absorption spectrum. The results are shown in Table 1.

TABLE 1

| Example No. | 1 | 2 | 3 | 4 |
|---|---|---|---|---|
| Kind of polymer | A | B | C | D |
| Hydrogenation degree* (%) | 99 | 98 | 99 | 97 |

Note:
*Degree of hydrogenation of olefinic double bonds (the same applies hereinafter).

EXAMPLES 5 to 10 AND COMPARATIVE EXAMPLE 1

JSR SL 552 was dissolved in cyclohexanone containing 3000 ppm of tetrahydrofuran to prepare a polymer solution having a concentration of 20% by weight.

Into a dried 10-liter autoclave was charged 5 kg of the resulting polymer solution and the polymer solution was maintained at 40° C. with stirring.

Subsequently, 1.5 millimoles of a lithium compound as shown in Table 2 was added and stirred, and thereafter, 100 ml of a cyclohexane solution of 0.25 millimole of a bis(cyclopentadienyl)titanium compound as shown in Table 2 was charged into the autoclave. Dried hydrogen gas was fed to the autoclave at a pressure of 10 kg/cm$^2$G and the contents of the autoclave were stirred to hydrogenate the polymer. The degree of hydrogenation of the hydrogenated polymer obtained was as shown in Table 2.

TABLE 2

|  | Example 5 | Example 6 | Example 7 | Example 8 | Example 9 | Example 10 | Comp. Ex. 1 |
|---|---|---|---|---|---|---|---|
| Lithium compound (B) | Methoxy-lithium | Phenoxy-lithium | Benzyloxy-lithium | 2,6-Di-t-butyl-4-methyl-phenoxy-lithium | 2,6-Di-t-butyl-4-methyl-phenoxy-lithium | 2,6-Di-t-butyl-4-methyl-phenoxy-lithium | Sec-Butyl-lithium |
| Bis(cyclo-pentadienyl)-titanium compound (A) | Bis-(cyclo-penta-dienyl)-titanium dichloride | Bis-(cyclo-pentadi-enyl)-titanium dichloride | Bis-(cyclo-pentadi-enyl)-titanium dichloride | Bis-(cyclo-pentadi-enyl)-titanium-dibenzyl | Bis-(cyclo-pentadi-enyl)-titanium-diphenyl | Bis(cyclo-pentadi-enyl)-titaniumdi-p-tolyl | Bis(cyclo-penta-dienyl)-titanium-dichloride |
| Hydrogenation degree % | 97 | 99 | 98 | 100 | 100 | 96 | 52 |

EXAMPLES 11 to 15 AND COMPARATIVE EXAMPLES 2 and 3

KRATON® D-1101 was dissolved in purified cyclohexane to prepare a polymer solution having a concentration of 10% by weight.

Into a dried 10-liter autoclave was charged 5 kg of the resulting polymer solution, and the solution was maintained at 40° C. with stirring.

Subsequently, 2,6-di-t-butyl-4-methylphenoxylithium in an amount as shown in Table 3 and 100 ml of toluene having dissolved therein bis(cyclopentadienyl)-titaniumdibenzyl were charged into the autoclave, and thereafter, a dried hydrogen gas was fed thereto at a pressure of 20 kg/cm$^2$G, and the contents of the autoclave were stirred for 30 minutes to hydrogenate the polymer. The degree of hydrogenation of the hydrogenated polymer obtained was as shown in Table 3.

TABLE 3

|  | Example 11 | Example 12 | Example 13 | Example 14 | Example 15 | Comp. Ex. 2 | Comp. Ex. 3 |
|---|---|---|---|---|---|---|---|
| 2,6-Di-t-buytl-4-methylphenoxylithium (mmole) | 0.6 | 1.0 | 6.0 | 9.0 | 25.0 | 0 | 30 |
| Bis(cyclopentadienyl)-titaniumdibenzyl (mmole) | 0.1 | 1.0 | 1.0 | 1.0 | 5.0 | 1.0 | 1.0 |
| Hydrogenation degree (%) | 97 | 97 | 100 | 99 | 100 | 0 | 0 |

EXAMPLES 16 to 18

JSR SL 574 was dissolved in toluene containing 2,000 ppm of tetrahydrofuran to prepare a polymer solution having a concentration of 20% by weight.

Into a dried 10-liter autoclave was charged 5 kg of the polymer solution obtained and the solution was maintained at 50° C. with stirring.

Into the autoclave was charged 10 millimoles of 2,6-di-t-butyl-4-methylphenoxylithium, and then, a mixture previously prepared by mixing 100 ml of toluene having dissolved therein 1.5 millimoles of bis(cyclopentadienyl)titanium dichloride with 10 millimoles of an organometallic compound as shown in Table 4 in a nitrogen atmosphere was charged into the autoclave, after which the resulting mixture was stirred. Thereafter, a hydrogen gas was fed thereto at a pressure of 7 kg/cm$^2$G and the mixture was subjected to reaction for 30 minutes. The degree of hydrogenation of the hydrogenated polymer obtained was as shown in Table 4.

TABLE 4

| Example No. | 16 | 17 | 18 |
|---|---|---|---|
| Organometallic compound (C) | Triisobutyl aluminum | Diethyl-aluminum chloride | Dimethyl-magnesium |
| Hydrogenation degree (%) | 99 | 100 | 96 |

EXAMPLES 19 AND 20

In purified toluene was dissolved a cyclopentene polymer obtained by metathesis polymerization with $WCl_4$ and $Al(C_2H_5)_3$ or a methyl 5-norbornene-2-carboxylate polymer to prepare a polymer solution having a concentration of 20% by weight.

Into a dried 10-liter autoclave was charged 5 kg of the polymer solution obtained and the solution was maintained at 70° C. with stirring. Thereto were added 20 millimoles of sec-butyllithium and 10 millimoles of 2,6-di-t-butyl-p-cresol and the resulting mixture was subjected to reaction for 15 minutes. Subsequently, to the reaction mixture was added a mixture of 100 ml of toluene having dissolved therein 1 millimole of bis(cyclopentadienyl)titanium dichloride with 6 millimoles of diethylaluminum chloride, after which a hydrogen gas was fed thereto at a pressure of 15 kg/cm$^2$G and the mixture was subjected to reaction for 1 hour. The degree of hydrogenation of the hydrogenated polymer obtained was as shown in Table 5.

TABLE 5

| Example No. | 19 | 20 |
|---|---|---|
| Kind of polymer | Cyclopentene polymer | Methyl 5-norbornene-2-carboxylate polymer |
| Hydrogenation degree (%) | 100 | 95 |

EXAMPLE 21

JSR SL 552 was dissolved in purified cyclohexane to prepare a polymer solution having a concentration of 20% by weight.

Into a dried 10-liter autoclave was charged 5 kg of the polymer solution obtained, and then 10 millimoles of n-butyllithium and 10 g of tetrahydrofuran were added thereto. Subsequently, 9 millimoles of 2,6-di-t-butyl-p-cresol was added thereto, and the resulting mixture was subjected to reaction for 10 minutes.

The temperature of the contents of the autoclave was maintained at 40° C. and 100 ml of toluene having dissolved therein 1.5 millimoles of bis(cyclopentadienyl)-titanium dichloride was added thereto, after which a hydrogen gas was fed thereto at a pressure of 10 kg/cm$^2$G, and the resulting mixture was subjected to reaction for 30 minutes. The degree of hydrogenation of the hydrogenated polymer obtained was 98%.

EXAMPLE 22

In the same system as in Example 21, 2,6-dibutyl-4-methylphenoxylithium was produced and thereafter maintained at 60° C., to which was added a mixture previously prepared by mixing 1.0 millimole of bis(cyclopentadienyl)titanium dichloride with 5 millimoles of diethylaluminum chloride in 100 ml of toluene in a nitrogen atmosphere.

With stirring, a hydrogen gas was fed to the resulting mixture at a pressure of 15 kg/cm$^2$G and the mixture was subjected to reaction for 30 minutes. The degree of hydrogenation of the hydrogenated polymer obtained was 100%.

EXAMPLE 23

Into a 10-liter autoclave were charged 5 kg of degasified and dehydrated cyclohexane, 300 g of styrene and 700 g of 1,3-butadiene, and thereafter, 5 g of tetrahydrofuran and 0.7 g of n-butyllithium were added to the resulting mixture, after which the resulting mixture was subjected to polymerization. The polymerization temperature was elevated from 30° C. to 70° C. during the polymerization. When the polymerization conversion reached 100%, 1.6 g of 2,6-di-t-butyl-p-cresol was fed to the autoclave, and the resulting mixture was stirred for 10 minutes. From the change of the color of the polymer solution, it was confirmed that no polymer terminal lithium existed as a living anion. Subsequently, a mixture prepared by mixing 100 ml of a toluene solution containing 0.3 g of bis(cyclopentadienyl)titanium dichloride with 1 g of diethylaluminum dichloride in a hydrogen atmosphere was charged into the autoclave.

To the autoclave was fed a hydrogen gas at a pressure of 10 kg/cm$^2$G and the resulting mixture was subjected to reaction for 20 minutes, after which the reaction temperature was lowered from 70° C. to 40° C. and the mixture was subjected to reaction for a further 20 minutes. As a result, a hydrogenated polymer having a degree of hydrogenation of 100% was obtained.

COMPARATIVE EXAMPLE 4

In the same manner as in Example 23, polymerization was effected in a 10-liter autoclave to obtain a random SBR polymer solution, and thereafter, in the same manner as in Example 22, hydrogenation was conducted using bis(cyclopentadienyl)titanium dichloride and diethylaluminum dichloride. As a result, a hydrogenated polymer having a degree of hydrogenation of 65% was obtained.

COMPARATIVE EXAMPLE 5

In the same manner as in Example 23, polymerization was conducted in a 10-liter autoclave to obtain a random SBR polymer solution, and thereafter, a solution of a catalyst of nickel naphthenate, n-butyllithium and tetrahydrofuran (1:8:20 by mole) previously prepared in a separate vessel was charged into the autoclave so that the proportion of nickel became 1 mole per 2,000 moles of the olefin portion. Thereafter, a hydrogen gas was introduced into the reaction system and the resulting mixture was subjected to reaction at 70° C. for 2 hours. As a result, a hydrogenated polymer having a degree of hydrogenation of 95% was obtained.

EXAMPLE 24

Into a 10-liter autoclave were charged 5 kg of degasified and dehydrated cyclohexane and 150 g of styrene, and thereafter, 5 g of tetrahydrofuran and 0.8 g of n-butyllithium were charged thereinto. The resulting mixture was subjected to adiabatic polymerization starting at 30° C. After 15 minutes, 150 g of styrene was added and the resulting mixture was subjected to polymerization for a further 15 minutes. At this point, 2.6 g of 4,4'-diphenylmethane diisocyanate was added to the reaction mixture to modify the polymer terminals with an isocyanate. At this time, coupling was partially caused, and the proportion of the coupled polymer to the uncoupled polymer was 50/50. The temperature of the reaction mixture was adjusted to 40° C. and 0.8 g of n-butyllithium and 1.5 g of 2,6-d-t-butyl-p-cresol were added thereto, and then, 0.5 g of bis(cyclopentadienyl)-titanium dichloride and 2 g of diethylaluminum dichloride were added, after which hydrogenation was conducted at a hydrogen pressure of 10 kg/cm²G for 30 minutes.

As a result, a hydrogenated polymer having a degree of hydrogenation of 98% was obtained.

TEST EXAMPLE

The same procedure as in Example 1, 17, 21 or 23 or Comparative Example 1, 4 or 5 was repeated, except that the experiment date, the solvent used and the purification lot of monomer were changed to examine the difference in degree of hydrogenation of the hydrogenated polymer obtained. The results obtained were as shown in Table 6.

TABLE 6

| Repeated Example | Hydrogenation degree in repeated experiments (%) | | | | | | | | Average hydrogenation degree | Standard deviation of hydrogenation degree |
|---|---|---|---|---|---|---|---|---|---|---|
| Ex. 1 | 99 | 99 | 98 | 99 | 98 | 99 | 99 | 98 | 98.6 | 0.48 |
| Ex. 17 | 100 | 100 | 100 | 100 | 100 | 99 | 100 | 99 | 99.8 | 0.43 |
| Ex. 21 | 98 | 97 | 97 | 99 | 98 | 97 | 98 | 98 | 97.8 | 0.66 |
| Ex. 23 | 100 | 99 | 99 | 100 | 99 | 99 | 100 | 100 | 99.5 | 0.50 |
| Comp. Ex. 1 | 52 | 40 | 53 | 61 | 41 | 23 | 55 | 39 | 45.5 | 11.34 |
| Comp. Ex. 4 | 65 | 32 | 68 | 55 | 71 | 32 | 66 | 50 | 54.9 | 14.70 |
| Comp. Ex. 5 | 95 | 94 | 90 | 95 | 89 | 96 | 87 | 90 | 92.0 | 3.16 |

What is claimed is:

1. A process for hydrogenating a polymer having olefinic double bonds which comprises contacting the polymer with hydrogen in an inert organic solvent in the presence of a hydrogenation catalyst consisting essentially of
   (A) at least one bis(cyclopentadienyl)titanium compound represented by the formula (1):

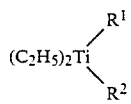 (1)

wherein $R^1$ and $R^2$, which may be the same or different, represent halogen atoms, hydrocarbon groups, phenolic hydroxyl groups, alkoxy groups or carbonyl groups;
   (B) at least one lithium compound represented by the formula (2):

$R^3O-Li$ (2)

wherein $R^3$ represents a hydrocarbon group, or a reaction mixture of an organolithium compound with an alcoholic or phenolic hydroxyl group-containing compound, the (A) component/the (B) component molar ratio being 1/0.5 to 1/20; and
   (C) at least one reducing organometallic compound selected from the group consisting of aluminum compounds, zinc compound and magnesium compounds, the (A) component/the (C) component molar ratio being 1/0.5 to 1/20.

2. The process according to claim 1, wherein the polymer having olefinic double bonds is a conjugated diene homopolymer, a copolymer of conjugated dienes or a random, block or graft copolymer of a conjugated diene and at least one olefinic monomer copolymerizable therewith.

3. The process according to claim 2, wherein the conjugated diene has 4 to 12 carbon atoms.

4. The process according to claim 3, wherein the conjugated diene having 4 to 12 carbon atoms includes 1,3-budtadiene, isoprene, 2,3-dimethyl-1,3-butadiene, 1,3-pentadiene, 2-methyl-1,3-pentadiene, 1,3-hexadiene, 4,5-diethyl-1,3-octadiene, 3-butyl-1,3-octadiene and chloroprene.

5. The process according to claim 3, wherein the conjugated diene is selected from the group consisting of 1,3-butadiene and isoprene.

6. The process according to claim 1, wherein the polymer having olefinic double bonds is polybutadiene, polyisoprene or a butadiene/isoprene copolymer.

7. The process according to claim 1, wherein the polymer having olefinic double bonds has a 1,2-vinyl content of 10% or more.

8. The process according to claim 1, wherein the polymer having olefinic double bonds has a molecular weight of 1,000 to 1,000,000.

9. The process according to claim 1, wherein the inert organic solvent is selected from the group consisting of aliphatic hydrocarbons, alicyclic hydrocarbons, aromatic hydrocarbons and ethers.

10. The process according to claim 9, wherein the aliphatic hydrocarbons include n-pentane, n-hexane, n-heptane and n-octane; the alicyclic hydrocarbons include cyclopentane, cyclohexane and cycloheptane; the aromatic hydrocarbons include benzene, toluene, xylene and ethylbenzene; and the ethers include diethyl ether and tetrahydrofuran.

11. The process according to claim 1, wherein a solution of the polymer having olefinic double bonds in the inert organic solvent is kept at a desired temperature, the hydrogenation catalyst is added thereto with or without stirring and the hydrogen is subsequently introduced thereinto to reach a desired pressure to hydrogenate the polymer.

12. The process according to claim 1, wherein the alkylaluminum is first added to the inert organic solvent, the alcoholic or phenolic hydroxyl group-containing compound is then added thereto, the (A) component is then added and thereafter the polymer having olefinic double bonds is hydrogenated with hydrogen.

13. The process according to claim 1, wherein the amount of the hydrogenation catalyst is 0.01 to 20 millimoles per 100 g of the polymer having olefinic double bonds.

14. The process according to claim 13, wherein hydrogen molecule is introduced in the form of a gas into a solution of the polymer having olefinic double bonds in the inert organic solvent with stirring in the presence of the hydrogenation catalyst at a temperature of 0° to 120° C.

15. The process according to claim 14, wherein the hydrogen pressure is 1 to 100 kg/cm²G.

* * * * *